United States Patent
Mortensen et al.

(10) Patent No.: US 10,144,581 B2
(45) Date of Patent: Dec. 4, 2018

(54) ARRANGEMENT FOR TRANSPORTING POWDER

(71) Applicant: TETRA LAVAL HOLDINGS & FINANCE S.A., Pully (CH)

(72) Inventors: Hans Henrik Mortensen, Noerresundby (DK); Frederik Larsen, Dronninglund (DK); Thomas Permin, Aalborg SO (DK); Palle Bach Jensen, Skoerping (DK)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/024,267

(22) PCT Filed: Sep. 19, 2014

(86) PCT No.: PCT/EP2014/070026
§ 371 (c)(1),
(2) Date: Mar. 23, 2016

(87) PCT Pub. No.: WO2015/040174
PCT Pub. Date: Mar. 26, 2015

(65) Prior Publication Data
US 2016/0214790 A1    Jul. 28, 2016

(30) Foreign Application Priority Data

Sep. 23, 2013 (SE) .................................... 1351094

(51) Int. Cl.
*B65D 88/26* (2006.01)
*B65D 88/66* (2006.01)
(Continued)

(52) U.S. Cl.
CPC ............ *B65D 88/66* (2013.01); *A47J 31/404* (2013.01); *B05B 7/1445* (2013.01); *B65D 88/26* (2013.01)

(58) Field of Classification Search
CPC ...... B65D 88/66; B65D 88/26; B05B 7/1445; A47J 31/404; B07B 1/42
(Continued)

(56) References Cited

U.S. PATENT DOCUMENTS 3,012,697 A * 12/1961 Rouse, Jr. ................ A21C 9/04
                                                      209/236
3,119,529 A *  1/1964 Maestrelli .............. B01D 37/02
                                                      222/145.1

(Continued)

FOREIGN PATENT DOCUMENTS

CN    201 470 205 U    5/2010
CN    201 686 220 U   12/2010
(Continued)

OTHER PUBLICATIONS

International Search Report (PCT/ISA/210) dated Jan. 5, 2015, by the European Patent Office as the International Searching Authority for International Application No. PCT/EP2014/070026.
(Continued)

*Primary Examiner* — Gerald McClain
*Assistant Examiner* — Ashley K Romano
(74) *Attorney, Agent, or Firm* — Buchanan Ingersoll & Rooney PC

(57) ABSTRACT

An arrangement for transporting powder comprises a hopper. The hopper is arranged on a stand and it has an inlet for receiving powder as well as an outlet for dispensing powder. A vibrator is attached to the hopper and the hopper is suspended to the stand via spring means.

18 Claims, 3 Drawing Sheets

(51) Int. Cl.
*B05B 7/14* (2006.01)
*A47J 31/40* (2006.01)

(58) Field of Classification Search
USPC .................................... 209/245, 364, 366
See application file for complete search history.

(56) References Cited

U.S. PATENT DOCUMENTS

| | | | | |
|---|---|---|---|---|
| 4,076,474 | A * | 2/1978 | Catenacci | B28B 1/084 |
| | | | | 404/105 |
| 4,353,485 | A * | 10/1982 | Chilko | G01F 11/18 |
| | | | | 198/533 |
| 5,156,089 | A * | 10/1992 | McCue | B41C 1/147 |
| | | | | 101/128.4 |
| 5,875,935 | A * | 3/1999 | Koch | B65D 88/66 |
| | | | | 222/200 |
| 6,015,225 | A * | 1/2000 | Williams | B01F 11/0068 |
| | | | | 366/114 |
| 6,253,966 | B1 * | 7/2001 | Dinkel | B65D 88/72 |
| | | | | 222/198 |
| 2005/0082234 | A1 * | 4/2005 | Solenthaler | B01D 33/0376 |
| | | | | 210/748.05 |
| 2007/0170207 | A1 * | 7/2007 | Kraus | B65G 65/44 |
| | | | | 222/199 |
| 2010/0108574 | A1 * | 5/2010 | Ouriev | B07B 1/42 |
| | | | | 209/240 |
| 2010/0135103 | A1 * | 6/2010 | Mathis, Jr. | B07B 1/42 |
| | | | | 366/114 |
| 2012/0193357 | A1 * | 8/2012 | Pleima | A01F 25/2018 |
| | | | | 220/200 |
| 2013/0161355 | A1 * | 6/2013 | Kawata | B65D 47/06 |
| | | | | 222/196 |
| 2014/0326751 | A1 * | 11/2014 | Snape | B65D 88/66 |
| | | | | 222/105 |
| 2018/0056330 | A1 * | 3/2018 | Stemper | B07B 1/30 |
| 2018/0193880 | A1 * | 7/2018 | Dumbaugh | F23H 9/04 |

FOREIGN PATENT DOCUMENTS

| | | | |
|---|---|---|---|
| DE | 41 20 201 A1 | 12/1992 | |
| GB | 1 291 116 A | 9/1972 | |
| JP | S47-006579 U | 9/1972 | |
| JP | S48-054690 A | 8/1973 | |
| JP | S53-141676 U | 11/1978 | |
| JP | S54-030479 U | 2/1979 | |
| JP | S59-221279 A | 12/1984 | |
| JP | 2005-040681 A | 2/2005 | |
| JP | 2008-127047 A | 6/2008 | |
| WO | WO 2013076482 A1 * | 5/2013 | .............. B65D 88/66 |

OTHER PUBLICATIONS

Written Opinion (PCT/ISA/237) dated Jan. 5, 2015, by the European Patent Office as the International Searching Authority for International Application No. PCT/EP2014/070026.

Office Action (Notification of Reasons for Refusal) dated Jul. 23, 2018, by the Japanese Patent Office in corresponding Japanese Patent Application No. 2016-543417 and an English Translation of the Office Action. (9 pages).

* cited by examiner

ARRANGEMENT FOR TRANSPORTING POWDER

FIELD OF THE INVENTION

The present invention relates to arrangements for transporting powders and in particular to powder hoppers.

TECHNICAL BACKGROUND

When distributing powdered material through a hopper the generation of "rat holes" is a well known effect. Starting from the assumption that a bulk of powdered material has a flow direction through the hopper, which generally is the case, rat holes may be defined as cavities formed when an upstream portion of the bulk does not follow the movement of a downstream portion of the bulk. The likelihood of these cavities being formed will be affected by properties of the powdered material, properties of the hopper, as well as processing properties, such as mean velocity of the bulk.

Such cavities may result in various drawbacks. One example is that unless the cavity collapses the flow of powdered material will stop into downstream processes, which is readily understood as being a drawback. Furthermore, as a cavity collapses a pressure wave may be generated and disturb dosing equipment arranged further downstream. Also, the formed cavity may entrain air into the bulk, which may affect a resulting downstream product, for example if the powder is subsequently mixed into a liquid to form a food product.

Thus, there is a desire in eliminating rat holes even before they appear.

Though hopper was mentioned as an example in the above, the same problem may occur as when removing powder from a powder silo, a big-bag emptying station etc. and the applicability of the present invention is therefore not limited to hoppers only.

The problem as such is not new, rather several solutions have been presented over the years. To mention a few examples air may be injected into the powder bulk, and there may be an agitation of the bulk. The present invention aims at providing an improved arrangement for avoiding the occurrence of rat holes.

SUMMARY

To that end the present invention relates to an arrangement for transporting powder comprising a hopper arranged on a stand, the hopper having an inlet for receiving powder and an outlet for dispensing powder, wherein a vibrator is attached to the hopper and wherein the hopper is suspended to the stand via spring means cancelling out propagation of vibrations generated by the vibrator. The arrangement is particularly configured to prevent the occurrence of 'rat holes', cavities, generated in a mass of powder being transported through the hopper.

In one or more embodiments the outlet comprises a resilient arrangement configured to prevent vibrations from propagating away from the outlet. This resilient arrangement may in one or several embodiments be selected from the group comprising: a flexible hose piece (e.g. an length of hose made from a resilient material such as an elastomer or from a metal bellow hose piece) incorporated in the downstream outlet pipe and an integrated flexible part of the powder hopper (e.g. an elastomer or metal bellow part or combinations thereof. Some specific examples will be given in relation to the detailed description of embodiments.

A bluff body may in one or more embodiments be arranged inside the hopper, and this bluff body may be configured to vibrate, either by comprising a separate bluff-body vibrator or by being suspended to the hopper via springs, or a combination thereof.

DETAILED DESCRIPTION OF EMBODIMENTS

Figure 1:
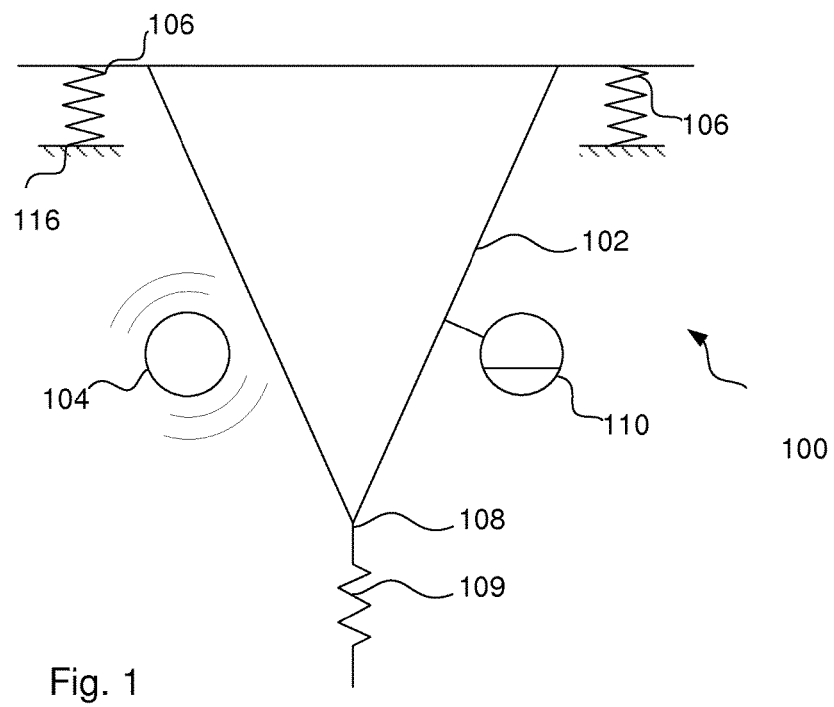
FIG. 1 is a cross section showing the principle arrangement of a first embodiment of the present invention.

FIG. 1 is a schematic drawing used to explain the basic principle of a first embodiment 100 of the present invention. A hopper 102 (or hopper cone in the present embodiment) is configured to guide a powder material from a first (upper) end to a second (lower) end. It has a generally conical shape and the surface contacting the powder is preferably made from a material not promoting agglomeration. The material may be stainless steel, yet surface treatments to reduce friction are possible even if not essential.

A vibrator 104 is connected to the hopper 102 such that activation of the vibrator 104 may be used to induce a vibration to the hopper 102 and thereby to the powder contained therein. The vibrator may preferable be electrically or pneumatically powered and of a rotating mass imbalance type or reciprocating mass hammer type and it may be mounted rigidly on the hopper cone. It is not the purpose of the present invention to state exact frequency intervals for various installations, yet typical vibration frequencies may range from 15 to 60 Hz. The rotational imbalance and motor power of the vibrator is selected according to the weight of the powder filled hopper while the hopper suspension springs may be designed to obtain an eigenfrequency of the entire system (hopper, spring, powder) equal or close to the vibrator excitation frequency, or vice versa to further enhance the effect.

The hopper is arranged on a stand or other framework (not shown in FIG. 1) and is connected thereto via a suspension arrangement 106, e.g. comprising one or more springs, or one or more springs and dampers. The purpose of the suspension arrangement 106 is to allow for the hopper part to oscillate with large amplitude, e.g. between 1 and 50 mm and also to prevent vibrations from propagating from the hopper 102 to the stand or to any other surrounding equipment or at least to dampen it to an acceptable level.

In the lower portion of the hopper 102 an outlet 108 is arranged. There is also a resilient arrangement 109 preventing propagation of vibrations via the outlet 108. This may be solved by using a flexible conduit. A flexible conduit may consist of a conduit which is flexible in a longitudinal direction thereof, e.g. a spirally wound flexible pipe, a non-tensioned tube made from fabric or cloth material, a bellow tube etc. yet it also may be a hose or pipe which is rigid in a longitudinal direction thereof yet where a sufficient length is provided for the end fastened to the outlet 108 to be allowed to move freely without inducing a movement of the second end of the hose or pipe. A generalization of the above examples may be that the outlet 108 should comprise a resilient arrangement 109 configured to prevent propagation of vibrations away from the outlet.

The hopper 102 may also comprise a level sensor 110 controlling the level of powder in the hopper 102.

Consequently the vibrator 104 is used to excite the complete hopper 102 which is mounted on springs 106 and isolated from the surroundings through the outlet pipe 108 via a flexible membrane (or a flexible hose) 109. The vibrating hopper 102 allows for a silent operation while the vibration of the hopper is sufficient to avoid rat holes in most powders.

Figure 2:
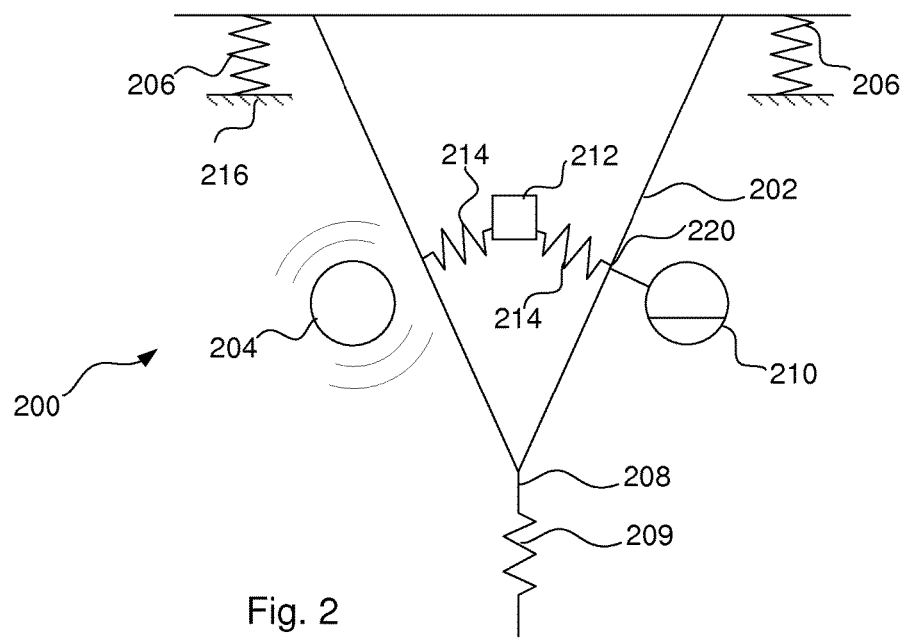
FIG. 2 corresponds to FIG. 1, yet shows a second embodiment of the present invention.

FIG. 2 is a cross section of a second embodiment of the present invention, also shown in a schematic manner. The second embodiment is an embodiment that may be used for more challenging powders, i.e. powders more prone to the generation of rat holes. The construction is basically identical and like components have been given like numbers, though in the second embodiment the base is 200 rather than the base of 100 used in relation to FIG. 1. The main difference of the second embodiment is a spring mounted bluff body 212 arranged inside the hopper 202. The bluff body 212 is arranged on springs 214. There are one or more springs, and in the present case two springs 214 are used, extending between the bluff body 212 and the hopper 202. The springs may be evenly distributed around the circumference of the hopper 202, i.e.

they are arranged in an opposing relationship in the present setup at a certain axial position (corresponding to a height in the view of FIG. 2). The exact position of the bluff body 212 may not be crucial, yet it is preferable that it is arranged where rat holes are prone to form, which corresponds to a position quite close to the outlet and that it does not block the outlet 208. The suggested solution for the bluff body is simple and reliable. More complex solutions could include the arrangement of a separate vibrator for the bluff body 212. In such an embodiment the bluff body 212 may still be spring suspended.

The springs 214 may be arranged at a slight upward angle, and in the present and more embodiments they extend perpendicularly from the interior surface of the hopper 202 towards a central axis of rotational symmetry thereof (this would correspond to 'orthogonally' if the surface was planar and 'in the direction of the normal' if the surface was curved). In other embodiments the springs may be arranged at another angle.

A characteristic feature of the bluff-body arrangement (the bluff body 212 and its suspension 214) is that it has an eigenfrequency similar or identical to the vibration frequency of the spring suspended hopper excitated by the vibrator 204. This means that as the vibrator 204 induces a vibration of the hopper 202 this vibration will propagate to the bluff-body arrangement and cause the bluff body 212 to vibrate, and in more general terms the eigenfrequency of the bluff-body arrangement is said to correspond to the vibration frequency of the spring suspended hopper exited by the vibrator 204. In this way the powder will be affected by vibrations from the hopper 202 as well as from the bluff body 212, from the outside as well as from the inside, and emerging rat holes will have an even lesser chance of prevailing. When the bluff body is covered with a certain layer of powder the transmitted energy from the vibrator is almost entirely used to vibrate the complete hopper system since the vibration of the bluff body is dampened by the surrounding powder. However when the bluff body is exposed—e.g. by an emerging rat hole—the transmitted energy from the vibrator is partly used to vibrate the bluff body back and forth.

The springs 214 may e.g. be linear springs or compression springs (coil springs) or tensional springs, or any other springs allowing for the adequate behaviour of the bluff body.

Another unexpected effect of the bluff body 212 is that it may also act to reduce the compression pressure on the powder portion residing in lower part of the hopper downstream of the bluff body. The compression pressure that arise due to the weight of the upstream powder bulk may compact the powder in a way that prevent desired powder transport through the hopper outlet, and by reducing the pressure the bluff body facilitates a flow of powder.

Figure 3:
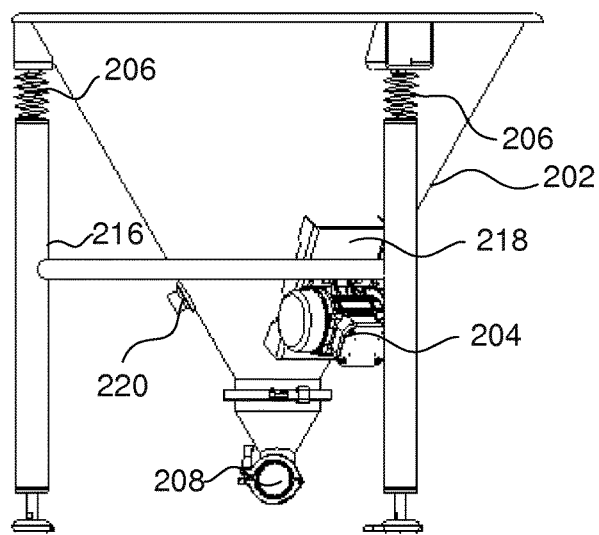
FIG. 3 is a sideview of a third embodiment showing one example of how the principle arrangement of the first or second embodiment may be realized in practice.

FIG. 3 is a side view of a third embodiment of the present invention. It may as well be used to illustrate how a practical layout of the principle drawings of FIGS. 1 and 2 could look like. Most components of FIG. 3 have been described in relation to FIG. 2, but for the stand or frame 216 and the vibrator mount 218. The stand is a three-legged stand with cross bars to increase stability, and the hopper cone 202 is connected to the stand 216 via compression springs 206. The vibrator mount 218 is in this embodiment a U-shaped profile made of sheet metal, and along the length of the legs of the U-shape the vibrator mount 218 is attached to the hopper cone 202, preferably by means of welds. Other attachment solutions are not to be excluded. A first purpose of the mount 218 may be to increase the contact surface between the vibrator 204 and the hopper 202. A second purpose may be to provide for a simple attachment which is readily accessible from the outside of the hopper 202.

Figure 4:
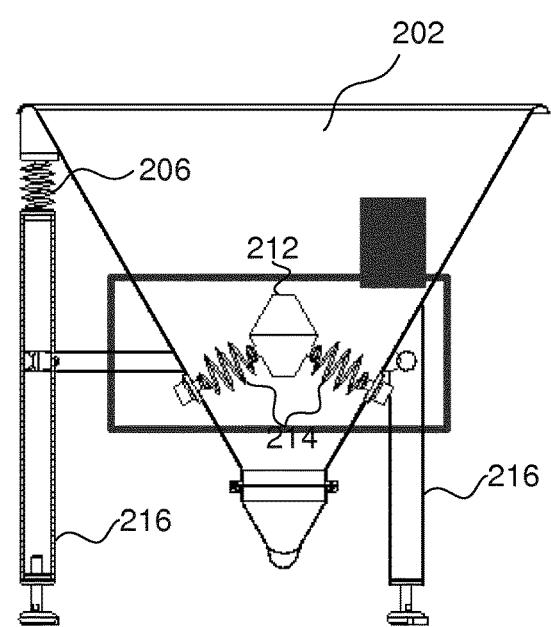
FIG. 4 is a cross section of FIG. 3 in the case of the second embodiment.

Attachment bolts 220 are also shown in the view of FIG. 3, which are used to mount springs 214 to the bluff body 212 shown in FIG. 2 and FIG. 4. If FIG. 3 is used to illustrate a practical example of the embodiment of FIG. 1 the attachment bolts 220 may be removed.

In the cross section of FIG. 4 the bluff body 212 and the corresponding suspension 214 is shown. All other components have been thoroughly described in relation to previous embodiments.

Figure 5:
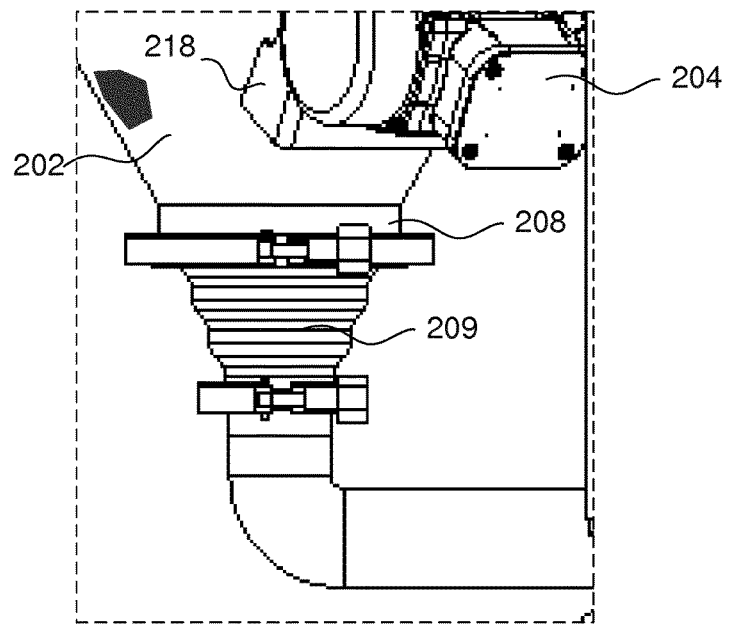
FIGS. 5 and 6 are detailed views of resilient arrangements for an outlet end.
Figure 6:
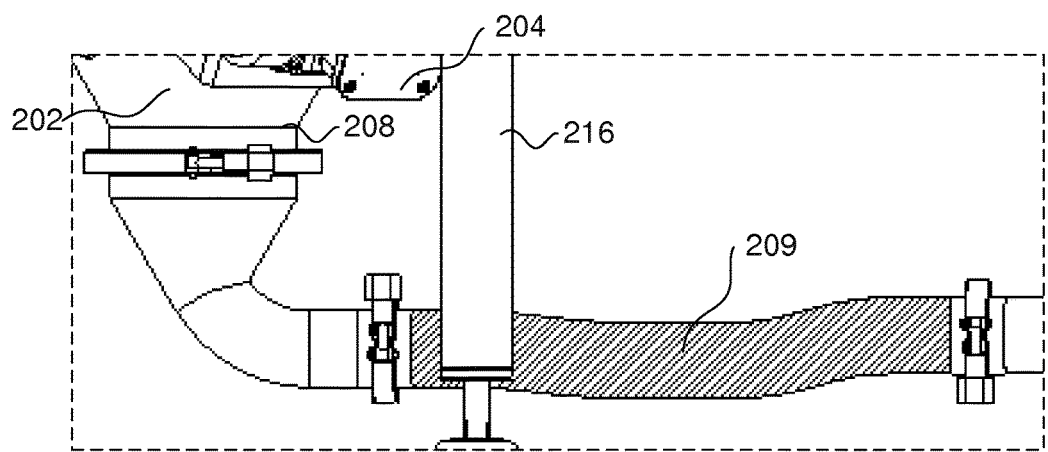

FIGS. 5 and 6 illustrate two example solutions for the resilient arrangement 209. In the embodiment of FIG. 5 the resilient arrangement 209 comprises a bellow construction forming an extension of the hopper cone 202. The bellow construction may be conical, and it may be formed from metal or an elastomer. In more general terms the resilient arrangement of this embodiment may be referred to as a membrane, In the embodiment of FIG. 6 the resilient arrangement 209 comprises a resilient hose arranged downstream the outlet 208, which may be considered to be a simpler solution than the previous one, though it may not necessarily be optimal in all applications. The resilient hose may again be formed from an elastomer or a metal-bellow construction, or another configuration allowing for the required degree of freedom. Connections between the resilient arrangement of FIG. 5 or FIG. 6 may be realized by standard components, as indicated in the drawings. Using metal bellows are not the sole solution in providing a flexible metal connector; there are other alternatives, such as spirally wound metal piping etc.

The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, and systems.

The invention claimed is:

1. An arrangement for transporting powder comprising a hopper arranged on a stand, the hopper having an inlet for receiving powder and an outlet for dispensing powder, a vibrator attached to the hopper, the hopper being suspended to the stand via spring means, a bluff body positioned in the hopper and configured to be vibrated by virtue of being suspended inside the hopper by way of springs that are located inside the hopper, the springs located inside the hopper being different from the spring means, the bluff body being solely supported by the springs within the hopper such that the bluff body is spring mounted inside the hopper.

2. The arrangement of claim 1, wherein the outlet comprises a resilient arrangement configured to prevent vibrations from propagating away from the outlet.

3. The arrangement of claim 2, wherein the resilient arrangement is selected from the group comprising: an elastomer hose piece, a metal bellow hose piece, and an elastomer membrane or any combination thereof, integrated adjacent or in combination with the hopper or downstream the outlet of the hopper.

4. The arrangement of claim 2, wherein a bluff body arrangement comprising the bluff body and the springs suspending the bluff body to the hopper has an eigenfrequency corresponding to a vibrational frequency of the hopper.

5. The arrangement of claim 1, wherein the vibrator is a first vibrator, and the bluff body comprises a second vibrator.

6. The arrangement of claim 1, wherein a bluff body arrangement comprising the bluff body and the springs suspending the bluff body to the hopper has an eigenfrequency corresponding to a vibrational frequency of the vibrator.

7. The arrangement of claim 1, wherein the vibrator is attached to the hopper via a vibrator mount welded to the hopper.

8. The arrangement of claim 1, wherein the vibrator is a rotating mass imbalance type or reciprocating mass hammer type.

9. The arrangement of claim 1, wherein the arrangement is a powder hopper.

10. The arrangement of claim 1, wherein a frequency supplied by the vibrator is tuned to an eigenfrequency of the hopper and the spring means, optionally including any contents of the hopper.

11. The arrangement of claim 1, wherein the arrangement is a conical powder hopper.

12. The arrangement of claim 1, wherein
the bluff body possesses an outer surface,
the hopper possesses an inner circumference,
a first spring of the springs extends from the inner wall of the hopper to the outer surface of the bluff body,
a second spring of the springs extends from the inner wall of the hopper to the outer surface of the bluff body, and
the first spring is positioned opposite to the second spring on the inner wall of the hopper so that the first and second springs are evenly distributed around the inner circumference of the hopper.

13. The arrangement of claim 12, wherein the first and second springs extend at an upward angle from the inner wall of the hopper to the outer surface of the bluff body.

14. An arrangement for transporting powder comprising:
a stand;
a hopper mounted on the stand by way of a plurality of first springs, the hopper including an inlet for receiving powder to introduce powder into an interior of the hopper and an outlet for dispensing powder from the interior of the hopper, the hopper possessing an inner surface surrounding the interior of the hopper;
a vibrator attached to the hopper to vibrate the hopper as well as powder contained in the hopper;
a bluff body located between the inlet and the outlet of the hopper so that an entirety of the bluff body is positioned in the hopper, the bluff body possessing an outer surface; and
a plurality of second springs each extending from the inner surface of the hopper to the outer surface of the bluff body so that the bluff body is spring mounted in the interior of the hopper so that the bluff body is able to vibrate, the bluff body being solely supported by the plurality of second springs in the interior of the hopper.

15. The arrangement of claim 14, wherein the outlet comprises a resilient arrangement configured to prevent vibrations from propagating away from the outlet.

16. The arrangement of claim 14, wherein the bluff body is configured to vibrate.

17. The arrangement of claim 14, wherein the vibrator is a first vibrator, and the bluff body comprises a second vibrator.

18. The arrangement of claim 14, further comprising a level sensor connected to the hopper and configured to control a level of the powder in the hopper.

* * * * *